(12) United States Patent
Taylor

(10) Patent No.: US 8,396,122 B1
(45) Date of Patent: Mar. 12, 2013

(54) VIDEO CODEC FACILITATING WRITING AN OUTPUT STREAM IN PARALLEL

(75) Inventor: Malcolm Ian Taylor, Palmerston North (NZ)

(73) Assignee: Otoy, Inc., Sherman Oaks, CA (US)

( * ) Notice: Subject to any disclaimer, the term of this patent is extended or adjusted under 35 U.S.C. 154(b) by 537 days.

(21) Appl. No.: 12/579,300

(22) Filed: Oct. 14, 2009

(51) Int. Cl.
*H04N 7/12* (2006.01)

(52) U.S. Cl. .......... 375/240.12; 375/240.26; 375/240.03

(58) Field of Classification Search .......... 375/130–153, 375/240.01–240.29, 240.12, 240.26; 704/500–504; *H04N 7/12, 11/02, 11/04; H04B 1/00, 1/66*
See application file for complete search history.

(56) References Cited

U.S. PATENT DOCUMENTS

| | | | | |
|---|---|---|---|---|
| 6,061,474 | A * | 5/2000 | Kajiwara et al. | 382/238 |
| 6,373,898 | B1 * | 4/2002 | Langer et al. | 375/240.23 |
| 6,707,398 | B1 * | 3/2004 | Lin et al. | 341/67 |
| 2004/0131267 | A1 * | 7/2004 | Adiletta et al. | 382/236 |
| 2005/0265447 | A1 * | 12/2005 | Park | 375/240.03 |
| 2006/0109911 | A1 * | 5/2006 | Jang et al. | 375/240.18 |
| 2008/0117978 | A1 * | 5/2008 | Kapasi et al. | 375/240.16 |
| 2009/0087107 | A1 * | 4/2009 | Porter | 382/233 |
| 2010/0150394 | A1 * | 6/2010 | Bloom et al. | 382/100 |

OTHER PUBLICATIONS

Wiegand, T.; Sullivan, G.J.; Bjontegaard, G.; Luthra, A.; , "Overview of the H.264/AVC video coding standard," Circuits and Systems for Video Technology, IEEE Transactions on , vol. 13, No. 7, pp. 560-576, Jul. 2003 doi: 10.1109/TCSVT.2003.815165.*
Wiegand, T.; Sullivan, G.J. Bjontegaard, G.; Luthra, A.;, "Overview of the H.264/AVC video coding standard," Circuits and Systems for Video Technology, IEEE Transactions on, vol .13, No. 7, pp. 560-576, Jul. 2003 doi: 10.1109/TCSVT.2003.815165.*

* cited by examiner

*Primary Examiner* — Jay Patel
*Assistant Examiner* — Jessica Prince
(74) *Attorney, Agent, or Firm* — James J. DeCarlo; Greenberg Traurig, LLP

(57) ABSTRACT

Methods, apparatuses and systems directed to a video codec that facilitates parallel processing operations is implemented on a graphics processing unit or other hardware device. The codec encodes video frames by dividing a frame into macroblocks and processing the macroblocks in parallel either via plane fitting operations or by motion estimation adjustments. A gathering operation writes the data of each macroblock onto an output stream in a parallel processing operation to accelerate writing the output from the memory of the graphics processing unit to a main memory of a hardware system.

14 Claims, 4 Drawing Sheets

$Pred_{DC}(X) = a_{DC} + b_{DC} - c_{DC}$

VIDEO CODEC FACILITATING WRITING AN OUTPUT STREAM IN PARALLEL

TECHNICAL FIELD

The present disclosure generally relates to video codecs.

BACKGROUND

Video compression refers to reducing the quantity of data used to represent video images and often combines image compression and motion compensation. A video codec is a device, or process implemented in software executed by a general purpose computing system, that enables video compression and/or decompression for digital video. Traditionally, video codecs apply various spatial and temporal transforms (such as discrete cosine transforms and the like) on the two-dimensional frames that make up a video sequence in order to reduce the raw data that must be stored on a storage medium or transmitted across a network.

A graphics processing unit or GPU (also occasionally called visual processing unit or VPU) is a specialized processor that offloads graphics rendering from the microprocessor. It is used in embedded systems, mobile phones, personal computers, workstations, and game consoles. Modern GPUs are very efficient at manipulating computer graphics, and their highly parallel structure makes them quite effective compared to general-purpose CPUs for a range of complex algorithms. Additionally, a somewhat recent concept is to use a modified form of a stream processor to allow a general purpose graphics processing unit. This concept turns the massive floating-point computational power of a modern graphics accelerator's shader pipeline into general-purpose computing power, as opposed to being hard wired solely to do graphical operations. In certain applications requiring massive vector operations, this can yield several orders of magnitude higher performance than a conventional CPU. For example, Nvidia (r) Corporation has begun releasing GPU cards that support an application programming interface (API) extension to the C programming language CUDA ("Compute Unified Device Architecture"), which allows specified functions from a normal C program to run on the GPU's stream processors. This makes C programs capable of taking advantage of a GPU's ability to operate on large matrices in parallel, while still making use of the CPU where appropriate.

SUMMARY

The present invention provides methods, apparatuses and systems directed to a video codec that facilitates parallel processing operations. In some implementations, the video encoding and/or decoding processes can be implemented on a graphics processing unit or other hardware device that allows for massively parallel processing operations to increase throughput and reduce processing latency, while still achieving a high compression ratios. Other implementations of the invention are directed to a novel gather operation that facilitates the use of massively parallel processing operations for entropy coding to increase throughput and/or reduce latency.

DESCRIPTION OF EXAMPLE EMBODIMENT(S)

The following example embodiments are described and illustrated in conjunction with apparatuses, methods, and systems which are meant to be illustrative, not limiting in scope.

A. Overview

A.1. Network Environment

Figure 1:
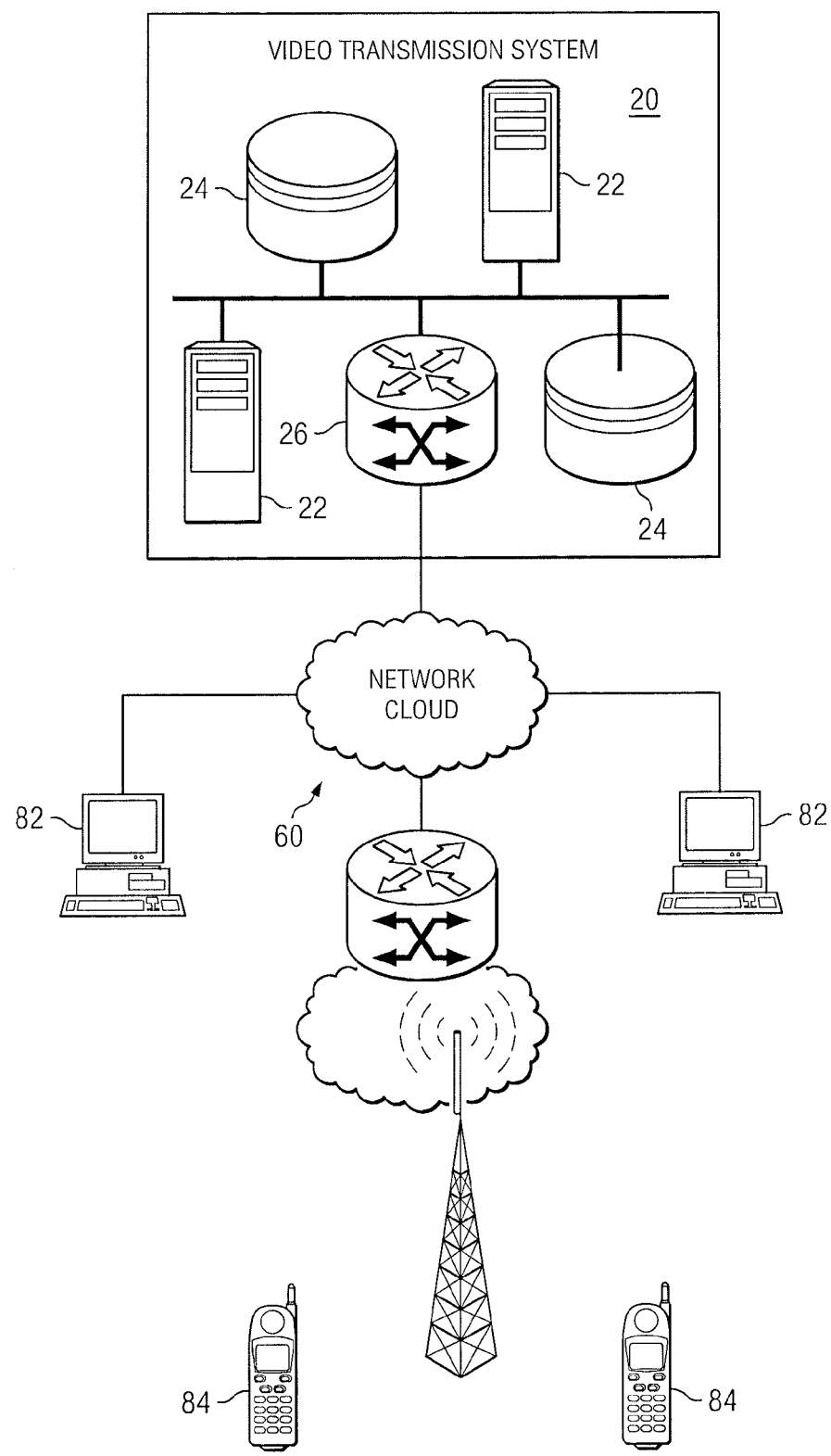
FIG. 1 is a schematic diagram illustrating a computer network environment in which implementations of the invention may operate.

FIG. 1 illustrates an example network environment in which particular implementations of the invention may operate. As FIG. 1 illustrates, particular implementations of the invention may operate in a network environment comprising a video transmission system 20 that is operatively coupled to a network cloud 60, which may include the Internet. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Some of the networks in network cloud 60 may be circuit-switched networks. The computer network environment, including network 60 can be a packet-based communications environment, employing TCP/IP protocols (for example), and/or other suitable protocols, and has a plurality of interconnected digital packet transmission stations or routing nodes. Client nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc.

Video transmission system 20 is a network addressable system that hosts one or more applications that stream video data to one or more users over a computer network. The video transmission system 20 may include web site and server functionality where users may request and receive identified web pages, video and other content over the computer network. The video data may incorporate non-interactive multi-media content, such a movies, animation, television programming, live broadcasts and the like, or may be video data rendered in connection with interactive games or other network-based applications in a server-side rendering system.

In particular implementations, video transmission system 20 comprises one or more physical servers 22 and one or more data stores 24. The one or more physical servers 22 are operably connected to computer network 60 via a router 26. The one or more physical servers 22, in one particular implementation, host functionality that allows users to browse available content, such as receiving requests from, and transmitting responsive data to, client nodes 82 and 84. In one implementation, the functionality hosted by the one or more physical servers may include web or HyperText Transport Protocol (HTTP) servers, Real Time Streaming Protocol (RTSP) servers, and the like.

Physical servers 22, as discussed above, host functionality directed to supporting and implementing video transmission system 20. In a particular implementation, the physical servers 22 may host one or more instances of a video streaming (e.g., RTSP) server and one or more instances of a remote rendering device server. In one implementation, a data store 24 may store video content such as digital content data objects, user information, and other media assets. A content data object or a content object, in particular implementations, is an individual item of digital information typically stored or embodied in a data file, binary large object (BLOB) or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, object or asset definitions, and the like. Structurally, content data store 24 connotes a large class of data storage and management systems. In particular implementations, content data store 24 may be implemented by any suitable physical system including components, such as database servers, mass storage media, media library systems, and the like. This data may be accessed to render video frames in substantial real-time for transmission to one or more client nodes 82, 84. The video codec described below can be used to compress the video data stream for transmission over network cloud 60.

A.2. Example Computing System Architecture

The server and client host systems described herein may be implemented in a wide array of computing systems and architectures. The following describes example computing architectures for didactic, rather than limiting, purposes.

Figure 2:
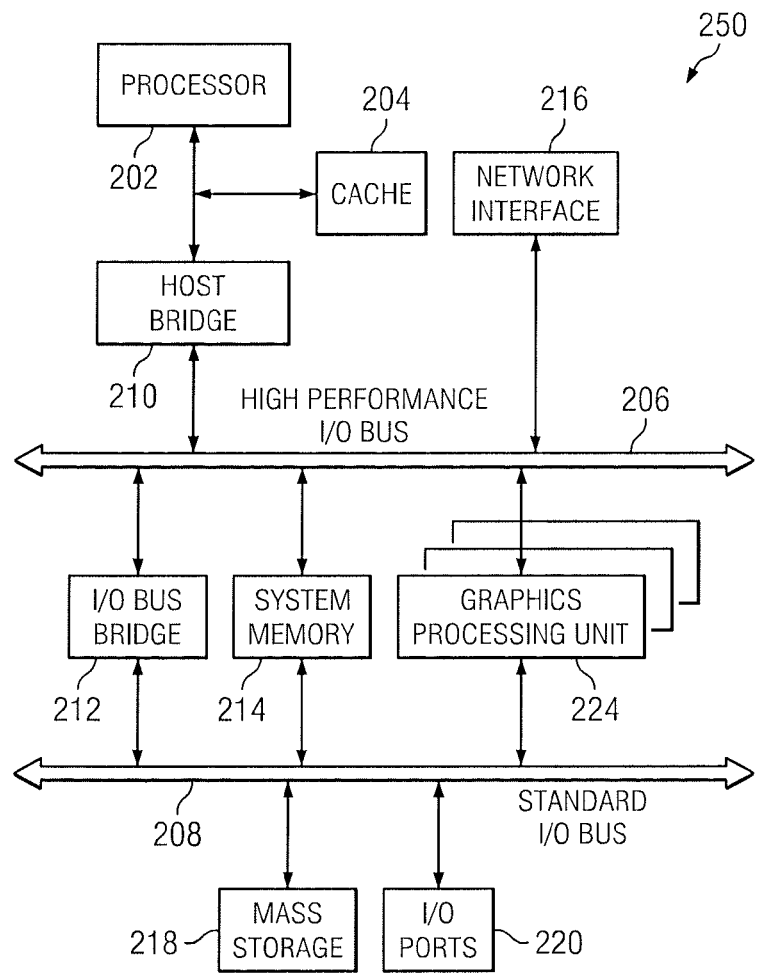
FIG. 2 is an example server system architecture according to one possible implementation of the invention.

FIG. 2 illustrates an example computing system architecture, which may be used to implement a physical server and, in some instances, a client host. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. For physical servers and clients hosting video compression functionality, hardware system 200 may further include one or more graphics processing units 224 coupled to buses 206 and 208. In one implementation, the graphics processing unit 224 may be embodied in a graphics or display card that attaches to the hardware system architecture via a card slot. In other implementations, the graphics processor unit 224 may be integrated on the motherboard of the server system architecture. Suitable graphics processing units include Advanced Micro Devices(r)AMD R7XX based GPU devices (Radeon(r) HD 4XXX), AMD R8XX based GPU devices (Radeon(r) HD 5XXX), Intel(r) Larabee based GPU devices (yet to be released), nVidia(r) 8 series GPUs, nVidia(r) 9 series GPUs, nVidia(r) 100 series GPUs, nVidia(r) 200 series GPUs, and any other DX11-capable GPUs.

Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

Graphics processing unit 224, in one implementation, comprises one or more integrated circuits and/or processing cores that are directed to mathematical operations commonly used in graphics rendering. In some implementations, the GPU 224 may use a special graphics unit instruction set, while in other implementations, the GPU may use a CPU-like (e.g. a modified x86) instruction set. Graphics processing unit 224 can implement a number of graphics primitive operations, such as Hitting, texture mapping, pixel shading, frame buffering, and the like. In addition to the 3D hardware, graphics processing unit 224 may include basic 2D acceleration and framebuffer capabilities. In addition, graphics processing unit 224 may support the YUV color space and hardware overlays, as well as MPEG primitives (such as motion compensation and iDCT). Graphics processing unit 224 may be a graphics accelerator, a GPGPU (General Purpose GPU), or any other suitable processing unit.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device or other computer readable medium, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202. The software routines can cause certain operations to be performed by the graphics processing unit 224 and/or the processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista/7 operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Additionally, video decoding clients may be hosted on the same or similar hardware architectures. For example, client computer 82 may include a GPU which loads encoded video into GPU memory, and decodes the encoded video data to render one or more frames of a video sequence. In other implementations, some or all of the video compression and de-compression operations may also be performed in system memory using a general purpose computing architecture as well.

The example video codec described herein processes video frames buffered in a memory. The memory may be main CPU memory or, in some implementations, the memory buffers available on a GPU. For example, a separate rendering process executing on a GPU (or a CPU) may render a video frame. The example codec may process the frame as described below for output to a video client for decoding and display. The following describes both an I frame encoding process and a P frame encoding process. The codec described herein can be used in an I-frame only mode or a P-frame mode.

I Frame Rendering Process

Figure 3:
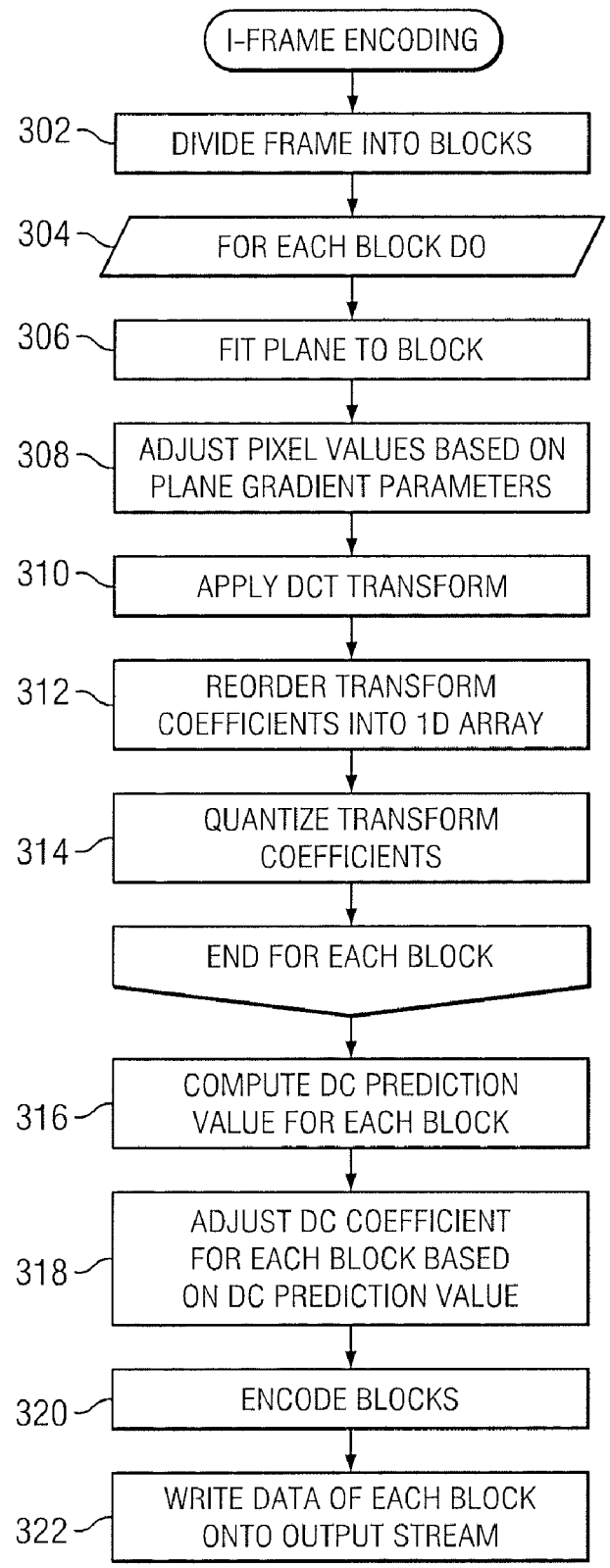
FIG. 3 is a flow chart setting forth an example method directed to encoding a video frame.

FIG. 3 illustrates an example process directed to encoding a video frame. Other operations that the codec, according to some implementations of the invention, may perform that are not illustrated in FIG. 3 include color space transformation and downsampling. As to color space transformation, the video codec may convert the pixel values from RGB color model values to a different color space, such as the YCbCr color space model. The YCbCr color space model has three components Y, Cb and Cr: the Y or luma component represents the brightness of a pixel, the Cb and Cr components represent the chrominance (split into blue and red components). The YCbCr color space conversion allows greater compression without a significant effect on perceptual image quality (or greater perceptual image quality for the same compression). The compression is more efficient as the brightness information, which is more important to the eventual perceptual quality of the image, is confined to a single channel, more closely representing the human visual system.

The transformation into the YCbCr color model enables downsampling, which is to reduce the spatial resolution of the Cb and Cr components (called "downsampling" or "chroma subsampling"). The ratios at which the codec applies downsampling, in one implementation, is 4:2:0 (resulting in a reduction by a factor of 2 in horizontal and vertical directions). For the rest of the compression process, the Y, Cb and Cr components are processed separately and in a very similar manner. FIG. 3 illustrates the process steps applies to the luma or Y component of the frame data. The operations applied to the chroma components of the image differ slightly as described in more detail below.

Referring now to FIG. 3, the video codec accesses the frame stored in memory and divides the frame into macroblocks (302). In one implementation, the size of each macroblock is 16 pixels by 16 pixels. As described below, DCT operations are performed, in some implementations, on 8×8 partitions. Accordingly, each macroblock, due to 4:2:0 downsampling includes 4 8×8 luma partitions, 4 4×4 Cb partitions and 4 4×4 Cr partitions. However, other macroblock sizes can be used. The video codec then performs certain transform and quantization operations on the luma and chroma partitions of each macroblock (304) as follows. These operations can be done serially or in parallel. If the encoding operations are performed on a GPU, the processing for the macroblocks can be accomplished in parallel resulting in reduced processing time and greater through-put.

As FIG. 3 illustrates, the codec fits a 2-dimensional plane to each macroblock that best models the luma values of the pixels of the macroblock. The plane is defined by the equation $z=ax+by$, where a and b define the gradient parameters of the plane. The codec then adjusts the luma values for the pixels of the macroblock based on the plane gradient parameters. In one implementation, the codec, for each pixel, subtracts the corresponding value of the plane equation from the pixel value at that location. Conceptually, this is defined by the following equation: adjusted $pixel(x,y)=pixel(x,y)-z$. The codec, in one implementation, does not adjust the values of the chroma partitions.

The codec then applies a Discrete Cosine Transformation (DCT) to the macroblock (310). In one implementation, the codec applies the DCT separately to the 4 luma partitions of 8×8 pixels and the 8 4×4 chroma partitions. The codec then applies a 2×2 Hadamard transform on the DC components of each DCT coefficient set corresponding to each luma partition, and to each chroma partition, to find correlation between the DC coefficient values. In an alternative implementation, the codec dynamically determines the size of the partitions. For example, the codec may dynamically choose between 4×4, 8×8 or 16×16 partitions based on rate and distortion for each partition choice.

The codec reorders the DCT coefficients for a macroblock into a 1-dimensional array (312). In one implementation, DCT coefficients of the 4 luma partitions are scanned in a zigzag order and then the DCT coefficients are interlaced to group the DC component values and other corresponding DCT component values together. In one implementation, the luma partitions are separately encoded from the chroma partitions. In one implementation, the chroma partitions are interlaced together in a manner similar to the luma channel. In other implementations, alternatives to zigzag re-ordering can be used.

The codec also quantizes the DCT coefficients in the 1-D array (314) using, for example, rate distortion optimization, which is a quantization process that evaluates whether to round up or down to the nearest integer, or to round to zero, based on the resulting cost (the number of bits required to encode) for each choice and the error or distortion associated with each choice. Rate-distortion optimization, in one implementation, essentially applies a video quality metric, measuring both the deviation from the source and the bit cost for each possible decision outcome. The bits are mathematically measured by multiplying the bit cost by the Lagrangian, a value representing the relationship between bit cost and quality for a particular quality level. The deviation from the source can be measured as the mean squared error, in order to maximize the Peak signal-to-noise ratio (PSNR) video quality metric. Calculating the bit cost can be accomplished by passing each block of video to be tested to the entropy coder to measure its actual bit cost.

Figure 4:
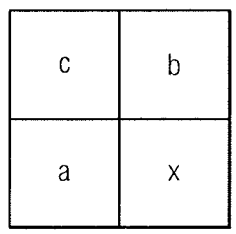
FIG. 4 is a diagram illustrating the calculation of DC prediction values based on neighboring macroblocks.

The codec then computes the DC prediction values for each macroblock (316) and adjusts the DC coefficient for each macroblock based on the DC prediction value (318), in one implementation, by subtracting the DC prediction value from the DC coefficient for the macroblock. In one implementation, the DC prediction value, X, is based on the DC coefficients of neighboring blocks, as shown in the diagram and equation set forth in FIG. 4. In other words, the DC prediction value for block X is based on the sum of the DC coefficients for blocks a and b, less the DC coefficient value of block c. In one implementation, the DC prediction value adjustments are performed on both the luma and chroma channels.

The codec then encodes the quantized coefficients into a reserved memory space for each block (320). In one implementation, the codec uses a form of variable length coding to compress the quantized coefficients for each block. In one implementation, the codec uses run-length encoding (RLE) followed by Huffman coding. After encoding the quantized DCT coefficients for each macroblock, the result is the encoded bits for the macroblock and a bit-length. With knowledge of the bit length, the codec can perform a parallel prefix sum to obtain the starting position of each macroblock in the final output bit stream.

The codec then causes the GPU to writes the encoded data onto an output stream to be buffered in main system memory, in one implementation, by writing the data of each macroblock in a raster-like order. In one implementation, the data can be written into CPU memory by the GPU using parallel processing operations. For example, the codec may cause the data to be written to an output stream in a gather operation. For example, a process or function tasked with writing a data word (such as 1 or 2 bytes) can use the starting bit positions for each macroblock and the position of the data word in the output stream for the frame to determine from which reserved memory locations to access the data bit to construct the data word and write it to memory. The gather operation allows for writing the output in a parallel processing operation utilizing the resources of the GPU thereby further increasing throughput. For example, in one implementation, a function can be defined that receives as inputs the position of the data or machine word in the memory to which the output stream is written. The function is operative to assemble the machine word from selected portions of the bits of one or more macroblocks based on the position of the data or machine word and the starting bit values of the macroblocks, and write the data of machine word to the memory. This function can be implemented in parallel to accelerate writing this output from a memory of a GPU to main memory for transmission over a network. In other implementations, the memory of the GPU can be directly accessed to write the data for transmission to a socket or other connection abstraction.

P Frame Encoding

As discussed above, the process illustrated in FIG. 3 can be used to naively encode each individual video frame at some desired frame rate. In some implementations, the process illustrated in FIG. 3 can be used in predictive coding schemes to encode so-called I frames, while the process described below in connection with FIG. 5 can be used to encode so-called P (predictive) frames.

Figure 5:
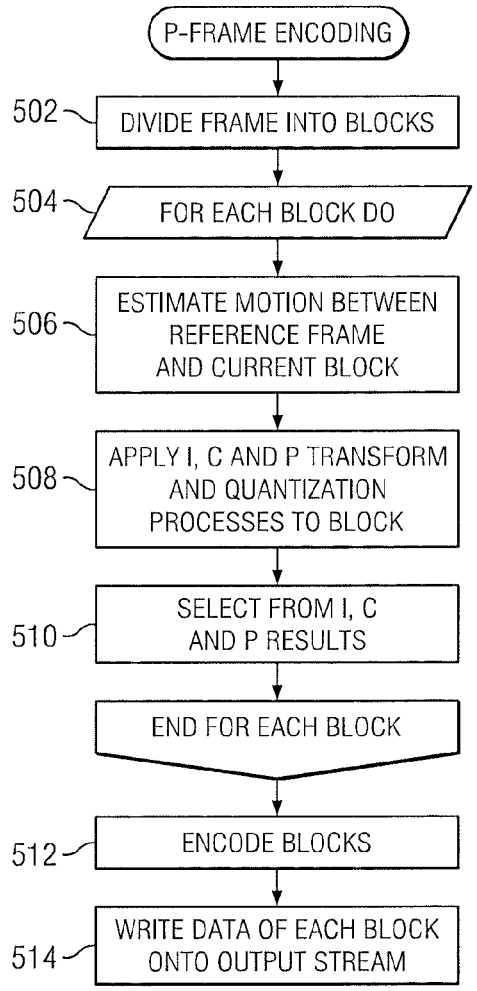
FIG. 5 is a flow chart showing an example alternative method directed to processing a video frame.

As FIG. 5 illustrates, the codec accesses a video frame and divides the frame into macroblocks (502). Similar to the processing illustrated in FIG. 3, the codec processes each macroblock (504), which processing can be done in parallel using the resources of a GPU or other parallel processing hardware. In the implementation shown, the codec estimates the motion between the current macroblock and the reference frame (506). The codec then processes the macroblock according to a plurality of modes (I, C, and P) and selects the best result for output. For the I mode, in one implementation, the codec computes the quantized DCT coefficients as discussed above in connection with FIG. 3. In the P mode, the code computes the quantized DCT coefficients in a manner similar to FIG. 3 with the differences being that 1) the plane fitting operations are substituted by motion estimation adjustments, and 2) adjustments to the DC coefficients based on DC prediction values are omitted. The C mode is essentially a copy of the corresponding macroblock of the reference frame, which is usually the previously decoded frame.

The codec then selects from among the results of the I, C and P modes (510). In one implementation, the codec uses rate distortion optimization to select the mode for a given macroblock. To find the error or distortion of the I, C and P modes, the codec can compare the true image to the decoded result of the I, C and P modes. In another implementation, the codec can compute the sum of the changes to the DCT coefficients resulting from quantization for the I and P modes. To compute the error for the C mode, the codec can take the difference between the current and the reference block and apply a DCT operation to that difference to yield the error. The cost for the C mode, in one implementation, is 1 bit to indicate an instruction to copy a macroblock. The cost for the I mode are the number of bits of the compressed DCT coefficients, while the cost for the P mode includes the number of bits for the compressed DCT coefficients and the motion estimation parameters. Various factor weighting schemes can be used on the error and/or costs terms to bias selection in favor of a given mode or for perceptual choices. For example, the codec may be configured to bias selection away from the C mode if the error in the DC coefficient is beyond some threshold.

The codec encodes the macroblocks (512) and writes the data of each macroblock onto an output stream in a manner the same as that described above in connection with FIG. 3. The data for each macroblock, in one implementation, includes a mode selection indicator, as well as the data discussed above. The data for each frame may also include a table indicating the starting bit positions for each macroblock. Additional frame metadata can also be added. The resulting data can be written to a socket for transmission across a network. In another implementation, the encoded data can be written to a data storage medium, such as an optical or magnetic disk.

Decoding the Video Stream

Figure 6:
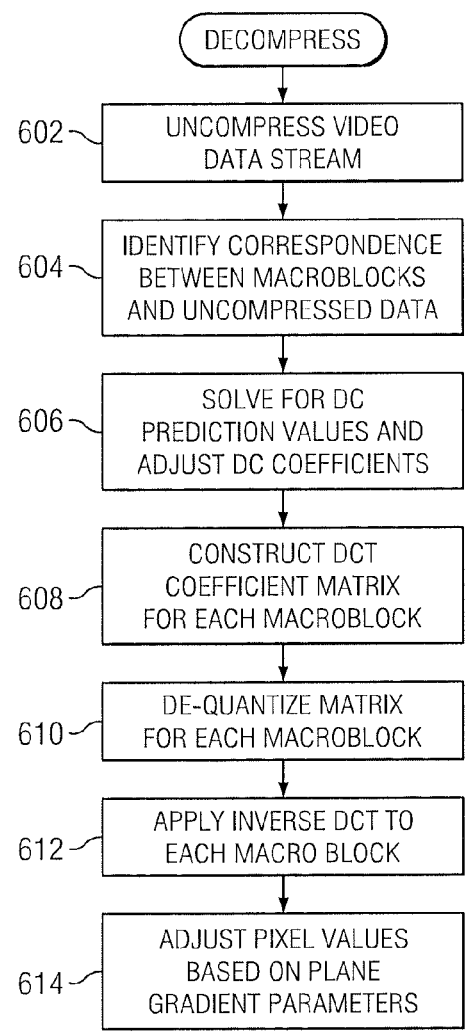
FIG. 6 is a flow chart showing an example method directed to decoding compressed data.

Decoding the compressed video data essentially involves the inverse of the operations discussed above. FIG. 6 illustrates an example decoding process according to one implementation of the present invention. In one implementation, the video decoder accesses the encoded data and decompresses the video data stream (602). In implementations, where RLE and Huffman coding is used, the decoder decompresses the data stream using known algorithms. The decoder then identifies the correspondence between macroblocks of a frame in the uncompressed video data (604). In one implementation, the video data also includes a table that identifies the starting bit positions for each macroblock. In some implementations involving P frames, the decoder can identify a mode (I, C or P) for each macroblock.

For I mode macroblocks, the decoder solves for the DC prediction values and adjusts the DC coefficients based on the determined DC prediction values (606). In one implementation, the decoder processes the macroblocks in a raster-like order. Accordingly, the DC prediction values can be computed by accessing the neighboring macroblocks, the DC coefficients of which have already been computed. In some implementations, the DC prediction values can be solved in parallel processing operations by performing the 2D equivalent of a prefix sum.

As FIG. 6 illustrates, the decoder constructs a DCT coefficient matrix for each partition of each macroblock (608) based on the inverse of the re-ordering process described above. The decoder then de-quantizes the matrix for each partition of the macroblocks (610) and applies an inverse DCT operation to the matrices (612). For I Frames and I-mode macroblocks, the decoder also adjusts the pixel values based on the plane gradient parameters (614). For P-mode macroblocks, the decoder adjusts the pixel values based on the motion estimation parameters. For C-mode macroblocks, the decoder avoids all of the following operations and merely copies the data of the corresponding reference frame macroblock. Although not illustrated in FIG. 6, the decoder may also upsample the chroma components of the video data and remap the data from the YCbCr color model to the RGB color model. The resulting data can be written to on-screen memory for display by a display device.

The decoder operations described above can be implemented on a general purpose computer or a mobile device using the resources of the central processing unit. In other implementations, the resources of a GPU can be used to facilitate some or all of the decoding operations discussed above. Furthermore, many of the operations can be done in parallel or in serial. For example, the processing at the macroblock level can be processed in parallel.

Lastly, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by a processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, although the embodiments described above operate in connection with a client-server model, the video codec described above can also operate in peer-to-peer architectures as well, such as in connection with Video over IP or teleconferencing systems. Still further, the codec described above can be used to encode video data for storage on a data storage medium, such as a magnetic or optical disk. Other embodiments will be evident to those of ordinary skill in the art. It is therefore not intended that the present invention be limited, except as indicated by the appended claims.

What is claimed is:

1. A method executable by a computing system, the method comprising
    accessing data of a video frame buffered in a memory space;
    for one or more macroblocks of the video frame:
        fitting a plane based on pixel values of a macroblock;
        adjusting the pixel values of the macroblock based on an equation that defines the plane;
        computing a frequency domain transform on the pixel values to determine a plurality of transform coefficients for the macroblock;
        reordering the plurality of transform coefficients to form a one-dimensional array; and
        quantizing the transform coefficients;
    computing DC prediction values for each macroblock of the one or more macroblocks;
    adjusting DC coefficients of the one or more macroblocks by corresponding DC prediction values for each macroblock of the one or more macroblocks;
    compressing the data of the one or more macroblocks of the video frame such that a plurality of data words are formed; and
    writing the plurality of data words to an output stream in a parallel processing operation.

2. The method of claim 1 wherein the frequency domain transform is the discrete cosine transform.

3. The method of claim 1 further comprising converting the data of the video frame from a RGB color model to a YCbCr color space model.

4. The method of claim 3 further comprising downsampling one or more chroma components of the data of the video frame.

5. The method of claim 1 wherein writing the plurality of data words comprises calling a function to receive a position of at least one of the data words in the output stream, assemble the at least one data word from selected portions of the data of one or more compressed macroblocks based on the position of the at least one data word and the starting bit values of the compressed macroblocks; and
    write the assembled data word to the memory space.

6. The method of claim 1 wherein calling the function is performed for a plurality of data words in parallel using parallel processing capabilities of a graphics processing unit.

7. An apparatus comprising:
    one or more network interfaces;
    a memory;
    one or more processors;
    a graphics processing unit; and
    one or more code modules stored on a computer-readable storage medium, the one or more code modules comprising computer-readable instructions operative to cause the graphics processing unit to:
    access data of a video frame buffered in the memory;
    for one or more macroblocks of the video frame:
        fit a plane based on pixel values of a macroblock;
        adjust the pixel values of the macroblock based on an equation that defines the plane;
        compute a frequency domain transform on the pixel values to determine a plurality of transform coefficients for the macroblock;
        reorder the plurality of transform coefficients to form a one-dimensional array; and
        quantizing the transform coefficients;
    compute DC prediction values for each macroblock of the one or more macroblocks;
    adjust DC coefficients of the one or more macroblocks by corresponding DC prediction values for each macroblock of the one or more macroblocks;
    compress the data of the one or more macroblocks of the video frame to form a plurality of data words;
    write the plurality of data words to an output stream a parallel processing operation.

8. The apparatus of claim 7 wherein one or more of the code modules is operative to cause the graphics processing unit to operate on at least two of the macroblocks in parallel.

9. A method comprising
accessing data of a video frame buffered in a memory space;
for one or more macroblocks of the video frame:
  computing a frequency domain transform on the pixel values to determine a plurality of transform coefficients for the macroblock;
  reordering the plurality of transform coefficients to form a one-dimensional array; and
  quantizing the transform coefficients;
compressing the data of the one or more macroblocks of the video frame to form a plurality of data words, each compressed macroblock having a number of bits;
deriving starting bit values of an output stream for each compressed macroblock based on the corresponding number of bits;
calling a function operative to instruct a processing unit to write the plurality of data words of an output stream to a memory space in a parallel processing operation, wherein for each of the plurality of data words, the function is operative to receive a position of the data word in the output stream, assemble the data word from selected portions of the data of one or more compressed macroblocks based on the position of the data word and the starting bit values of the compressed macroblocks and write the assembled data word to the memory space.

10. The method of claim 9 wherein calling the function is performed for the plurality of data words in parallel using parallel processing capabilities of a graphics processing unit.

11. The method of claim 9 wherein the frequency domain transform is the discrete cosine transform.

12. The method of claim 9 further comprising converting the data of the video frame from a RGB color model to a YCbCr color space model.

13. The method of claim 12 further comprising downsampling one or more chroma components of the data of the video frame.

14. An apparatus comprising:
one or more network interfaces;
a memory;
one or more processors;
a graphics processing unit; and
one or more code modules stored on a computer-readable storage medium, the one or more code modules comprising computer-readable instructions operative to cause the graphics processing unit to:
access data of a video frame buffered in the memory;
for one or more macroblocks of the video frame:
  compute a frequency domain transform on the pixel values to determine a plurality of transform coefficients for the macroblock;
  reorder the plurality of transform coefficients to form a one-dimensional array; and
  quantize the transform coefficients;
compress the data of the one or more macroblocks of the video frame to form a plurality of data words, each compressed macroblock having a number of bits;
derive starting bit values of an output stream for each compressed macroblock based on the corresponding number of bits; and
call a function operative to instruct the graphics processing unit to write the plurality of data words of an output stream to the memory in a parallel processing operation for transmission by the one or more network interfaces, wherein for each of the plurality of data words the function is operative to receive a position of the data word in the output stream, assemble the data word from selected portions of the data of one or more compressed macroblocks based on the position of the data word and the starting bit values of the compressed macroblocks and write the assembled data word to the memory.

* * * * *